United States Patent
Merchant et al.

(10) Patent No.: US 6,904,043 B1
(45) Date of Patent: Jun. 7, 2005

(54) APPARATUS AND METHODS FOR STORING AND PROCESSING HEADER INFORMATION IN A NETWORK SWITCH

(75) Inventors: Shashank Merchant, Sunnyvale, CA (US); Ching Yu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/316,072

(22) Filed: May 21, 1999

(51) Int. Cl.⁷ .......................... H04L 12/28; H04L 12/56
(52) U.S. Cl. ...................... 370/402; 370/428
(58) Field of Search ........................ 370/389, 400–401, 370/402, 412–413, 419, 428, 429

(56) References Cited

U.S. PATENT DOCUMENTS

| | | | |
|---|---|---|---|
| 5,303,078 A | * | 4/1994 | Brackett et al. ............ 359/123 |
| 5,515,376 A | | 5/1996 | Murthy et al. |
| 6,091,707 A | * | 7/2000 | Egbert et al. ............... 370/229 |
| 6,449,273 B1 | * | 9/2002 | Jennings, III ............... 370/389 |

* cited by examiner

Primary Examiner—William Luther

(57) ABSTRACT

A network switch configured for switching data packets across multiple ports uses an internal memory to store frame headers for processing by decision making logic. The internal memory stores frame headers in a queue configured to store a number of the frame headers for each of the receive ports. A scheduler is included for facilitating the transfer the data from the queues to the decision making logic according to a predetermined priority. The scheduler is also able allocate the time slots in accordance with data traffic at the corresponding receive ports to maximize data throughput.

13 Claims, 16 Drawing Sheets

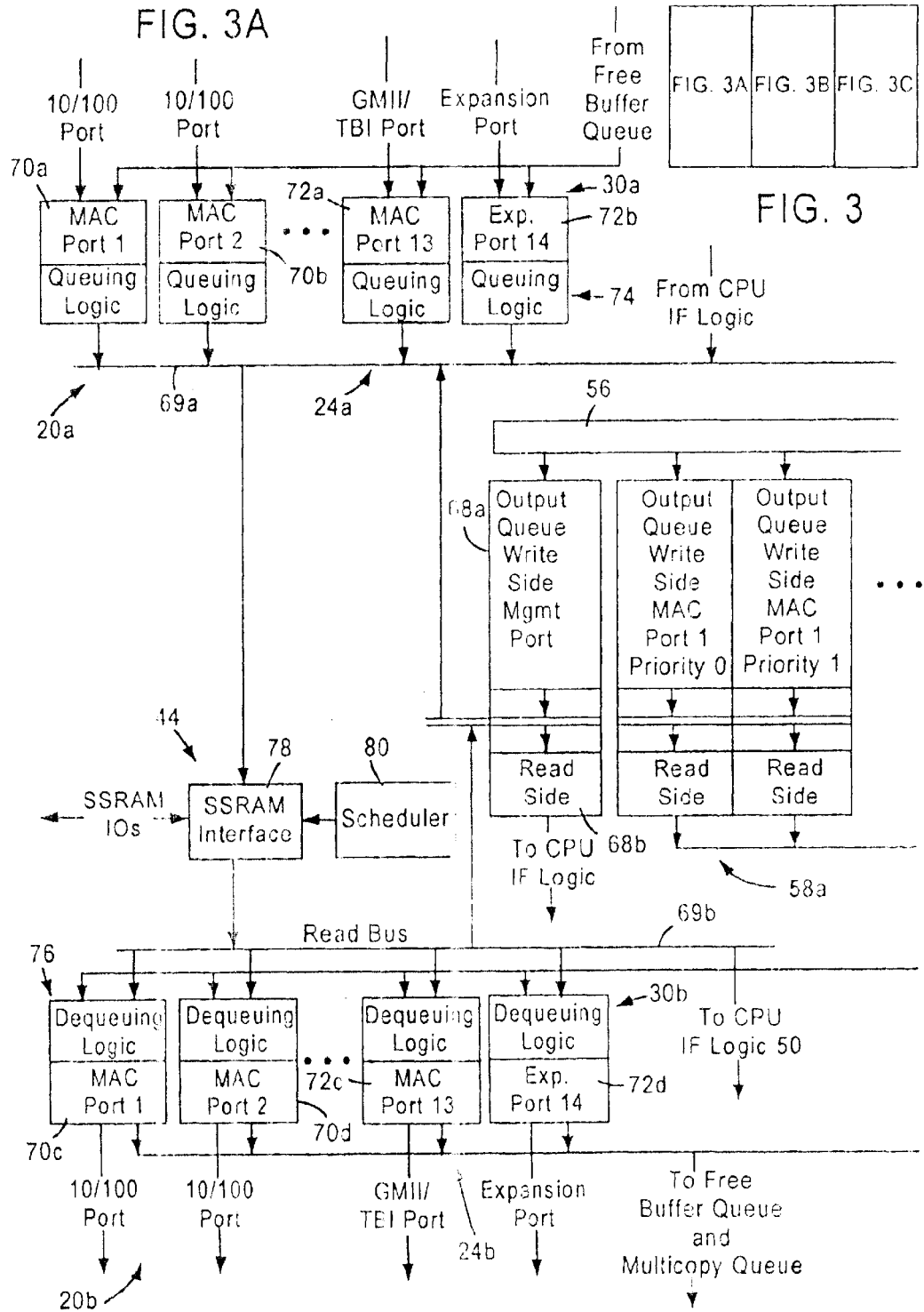

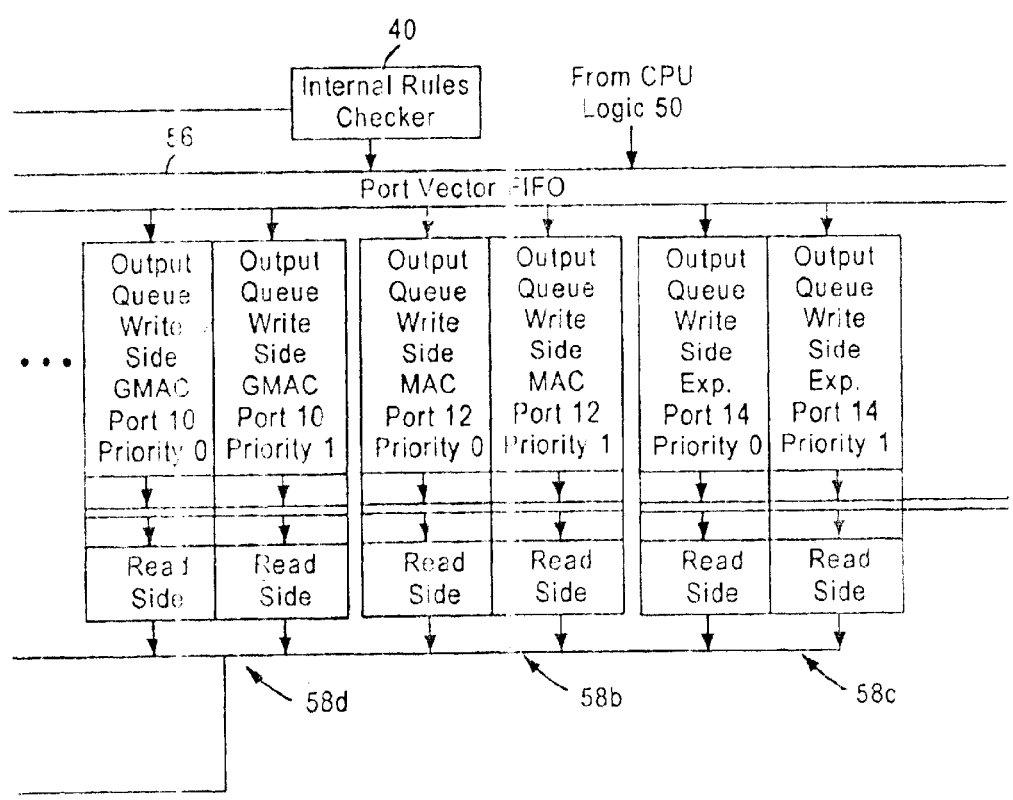

1

APPARATUS AND METHODS FOR STORING AND PROCESSING HEADER INFORMATION IN A NETWORK SWITCH

CROSS-REFERENCE TO RELATED APPLICATIONS

This application is related to the following commonly-assigned, copending applications entitled: INTERNAL RULES CHECKER QUEUE and DYNAMIC TIME SLOT ALLOCATION IN INTERNAL RULES CHECKER SCHEDULER.

TECHNICAL FIELD

The present invention relates to network communications and more particularly, to storing frame information in a network switch and transferring the frame information to a decision making engine.

BACKGROUND ART

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path. Typically, the switch controls the communication of data packets on the network.

The network switch includes switching logic for receiving and forwarding frames to the appropriate destinations. One arrangement for generating a frame forwarding decision uses a direct addressing scheme, where the network switch includes a fixed address table storing switching logic for the destination addresses.

For example, a frame may be received by the network switch with header information indicating the source address and destination address of the frame. The switching logic accesses the fixed address table using the source address and destination address as lookups to find the appropriate frame forwarding information. The switch then uses this information and sends the frame to the appropriate port(s).

When all of the stations connected to the network are simultaneously operating, packet traffic on the shared serial path can be heavy with little time between packets. Accordingly, many prior art systems transmit the data frame to an external memory for storage prior to processing. However, the data frame must then be transmitted back to the switch for processing by a decision making device. This is a time-consuming process that decreases the speed with which the data is transmitted to its destination. With increased network throughput requirements, such a processing arrangement often results in an unacceptable delay in forwarding frames to their respective destinations.

Additionally, many prior art systems assign fixed time slots for transferring data from the external memory to the decision making device. That is, each receive port is assigned a fixed time slot during which only the data received on that port is able to be transmitted from the external memory to the decision making device. In situations where a particular port has not received any data, the bandwidth allocated to that port is wasted.

SUMMARY OF THE INVENTION

There exists a need for a switching device that enables data to be stored on the switching device and then transferred for processing by a decision making device.

There is also a need for a method for storing frame headers and processing the frame headers by a decision making device.

These and other needs are met by the present invention, where a multiport switch uses an external memory to store data frames. When the data frames are transmitted to the external memory, frame header information is also stored in a memory on the multiport switch. The memory is configured to store multiple frame headers for processing by an internal decision making engine. A scheduler is also included on the multiport switch to allocate time slots for transferring the frame headers to the decision making engine.

According to one aspect of the invention, a multiport switch is configured for controlling the communication of data frames between stations. The switch includes a plurality of receive devices corresponding to ports on the multiport switch with each of the receive devices configured to receive data frames and transmit the data frames on an internal bus to an external memory interface. The switch also includes a plurality of queues corresponding to ports on the multiport switch with the plurality of queues formed on a memory device that includes a write port and a read port to enable data to be written to and read from the memory device simultaneously. Each of the plurality of queues is configured to store frame header information received via the write port. The switch further includes a scheduler configured to allocate time slots to the plurality of queues and a decision making engine configured to receive the frame header information in successive time slots via the read port and to generate data forwarding information.

Another aspect of the present invention provides a method for processing data frames in a multiport switch that includes a plurality of queues corresponding to ports on the multiport switch. The method includes receiving data frames at a plurality of receive devices and transmitting the data frames to an external memory interface. The method also includes writing frame header information from the data frames to a plurality of queues corresponding to the plurality of receive devices, where the plurality of queues are formed on a memory device that includes a write port and a read port. The method further includes allocating time slots to the plurality of queueing devices and transmitting the frame header information from the queues, via the read port and in successive time slots, to an internal decision making engine. The method also includes generating data forwarding information.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of system in general.

Switch Architecture Overview

Figure 1:
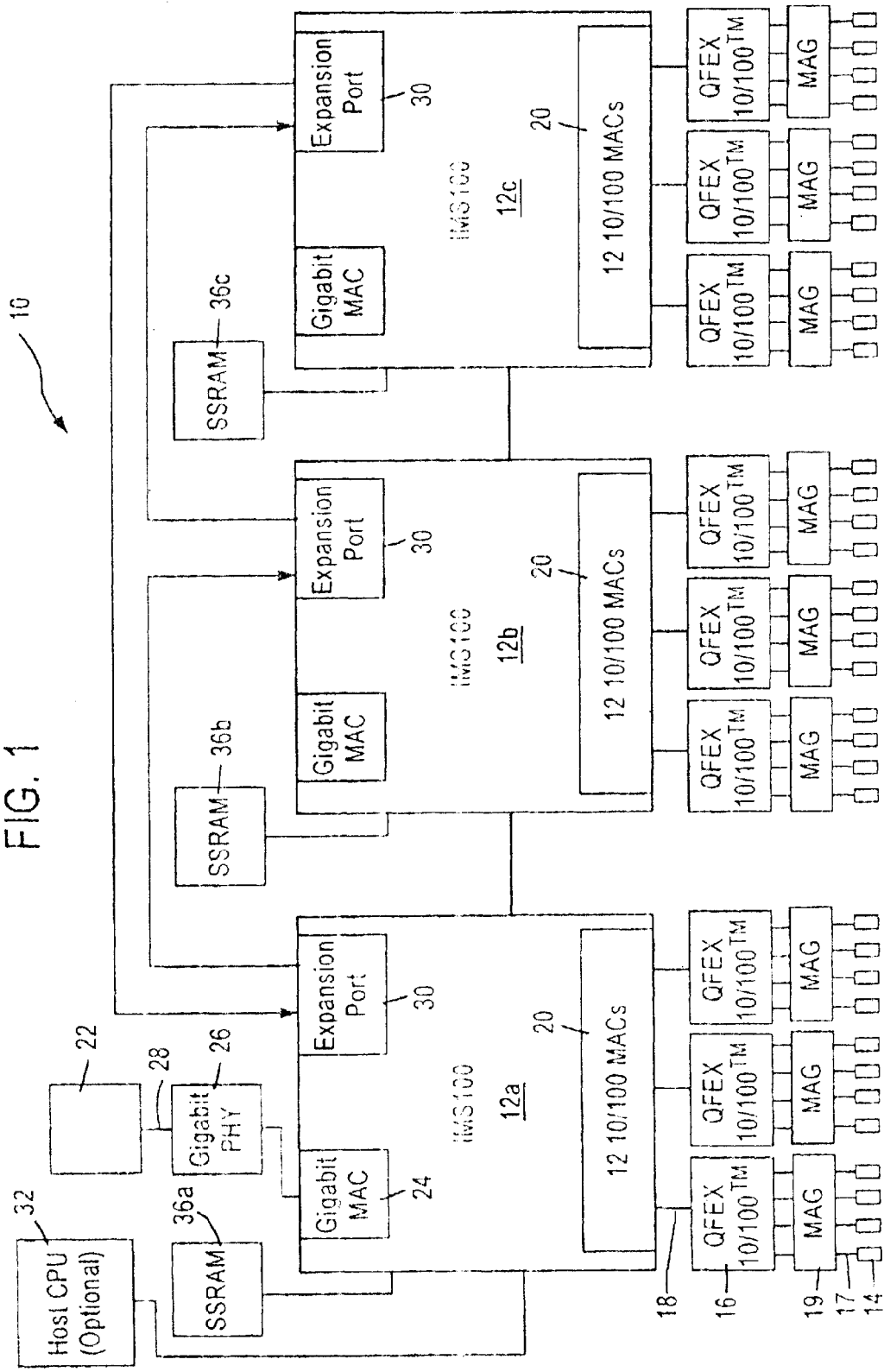
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
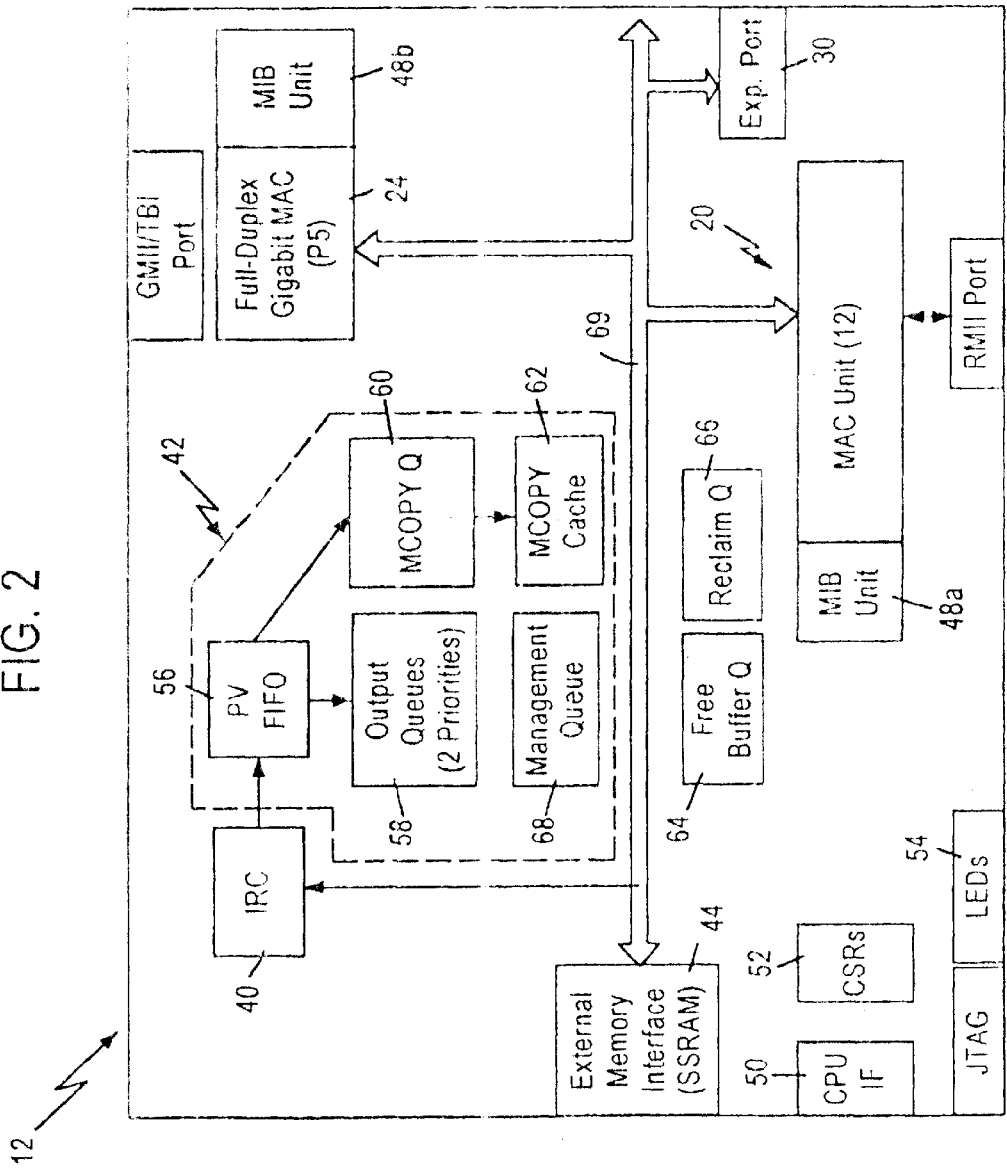
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48*a* and 48*b* (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally, the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 14. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3C:
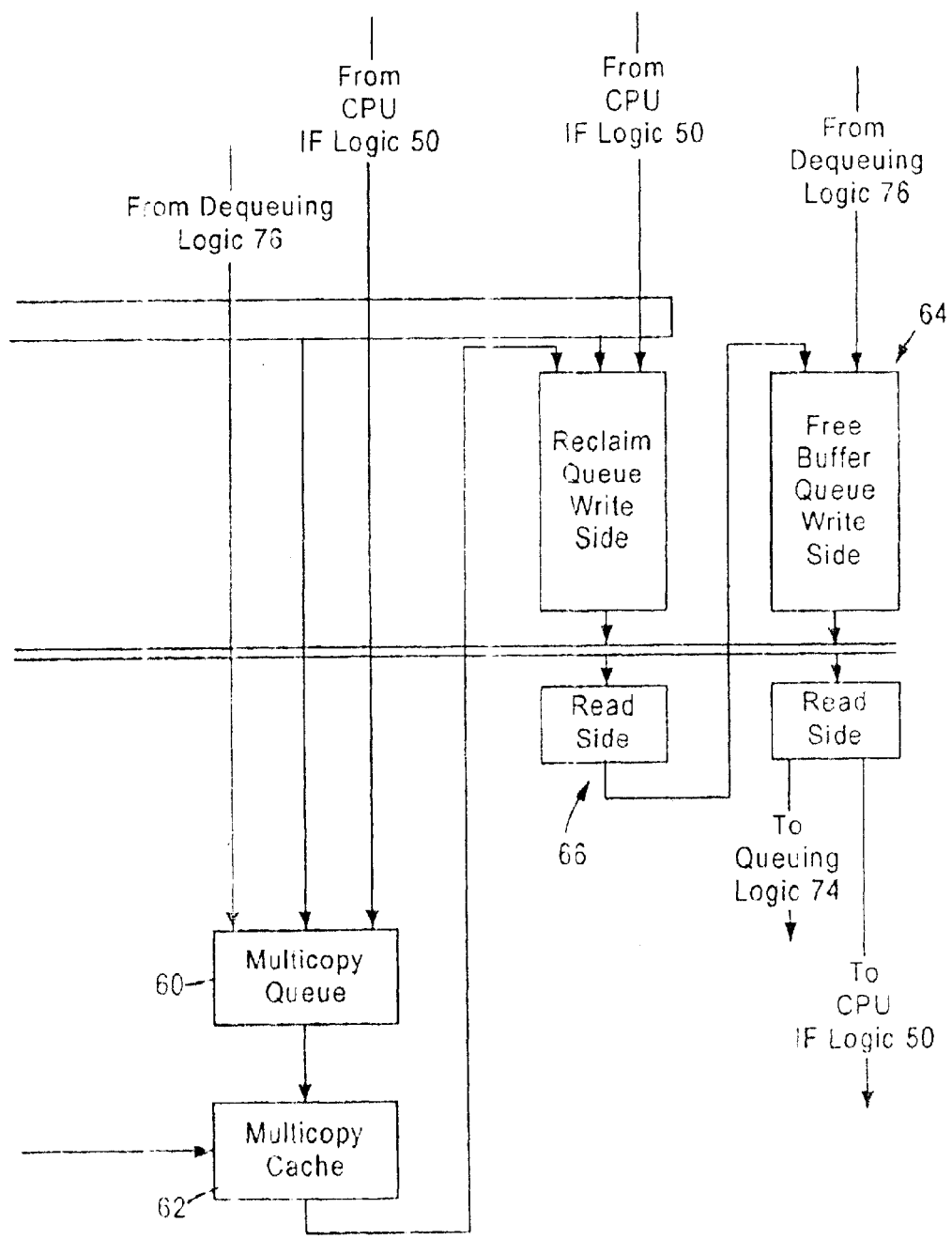
FIG. 3 is a detailed block diagram illustrating the switching subsystem of FIG. 2.

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30*b* of the gigabit MAC port 24 and the expansion port 30*a* also have transmit MAC modules 72*c* and 72*d*, respectively. The MAC modules are configured for full-duplex operation on the corresponding port, and the gigabit MAC modules 72*a* and 72*c* are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generates a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58*d* for the gigabit transmit MAC 72*c*. The dequeuing logic 76 for the transmit gigabit port 24*b* takes the frame pointer from the corresponding gigabit port output queue 58*d*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 are described below.

INTERNAL RULES CHECKER QUEUE AND SCHEDULER

The present invention is directed to the IRC 40 and more particularly to storing and processing frame headers. As described previously, each of the receive MAC modules illustrated in FIG. 3 includes queuing logic 74 for transferring received data from the corresponding internal receive FIFO to the external memory 36 and the IRC 40. The queuing logic 74 fetches a frame pointer from the free buffer queue 64 and then uses the fetched frame pointer to store a received data frame to the external memory 36, via the external memory interface 44. The external memory 36 stores the data frame at the location specified by the frame pointer.

The IRC 40 also stores a portion of the data frame in the IRC 40, while the data frame is simultaneously being transmitted over write bus 69a to SSRAM interface 78. The IRC 40 accomplishes this by "snooping on", i.e., monitoring, write bus 69a to determine when a data frame is being transmitted to SSRAM interface 78. The IRC 40 then stores the frame pointer value and the header information of the received data frame within the multiport switch 12. The frame header information includes the source address and destination address of the frame, along with VLAN tag information when the VLAN tag information is transmitted with the data frame. The IRC 40 processes the header information, as described in more detail below, and is able to identify the appropriate output MAC ports through which the data frame is to be transmitted. The data frame stored in external memory 36 is then transmitted back to the multiport switch 12 for transmission through the appropriate output port(s).

Figure 4:
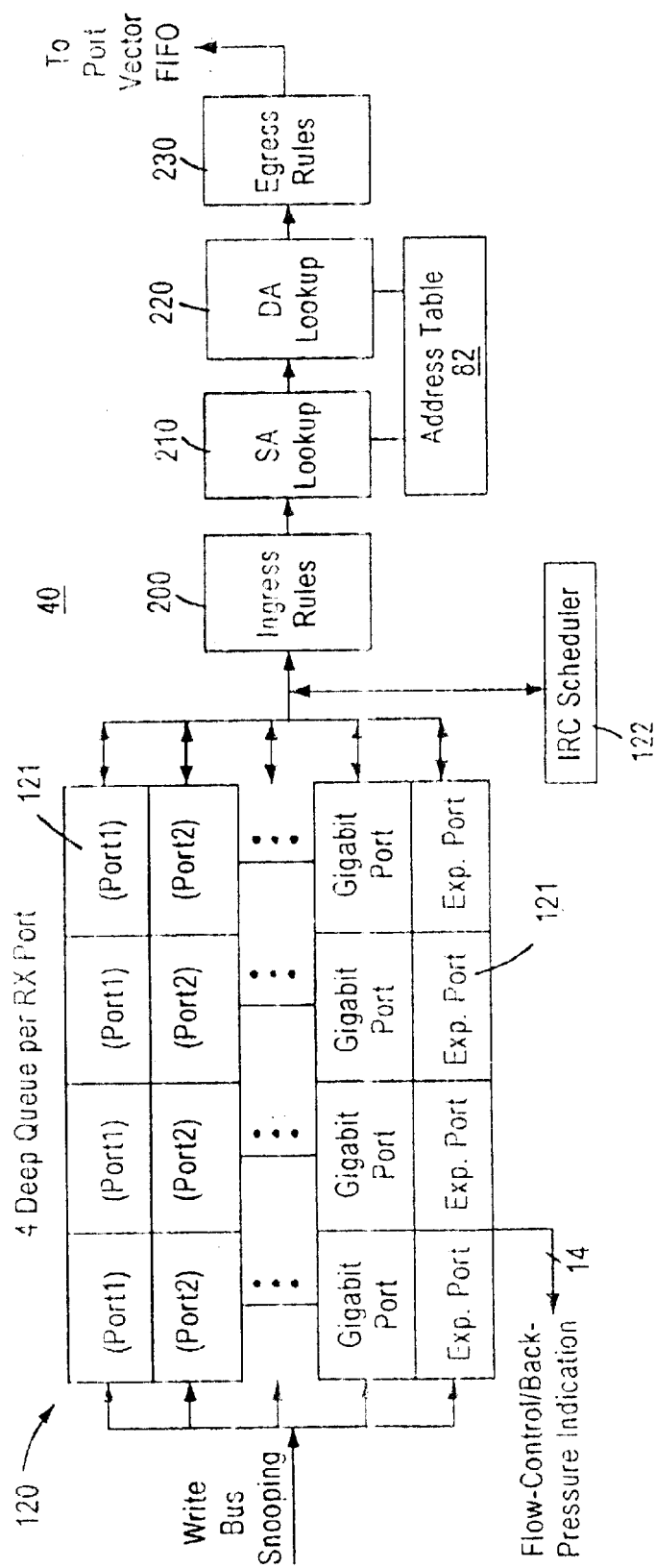
FIG. 4 is a detailed block diagram of the internal rules checker in accordance with an embodiment of the present invention.

According to an exemplary embodiment of the invention illustrated in FIG. 4, the IRC 40 stores the frame header information along with the frame pointer information in rules queue 120. According to the exemplary embodiment, the rules queue 120 contains multiple queues assigned to each receive port of the multiport switch. As illustrated in FIG. 4, each of the 10/100 Mb/s ports 1–12, the gigabit port 24 and the expansion port 30 are assigned separate queues consisting of four individual queues 121. Each individual queue 121 is formed on a synchronous random access memory (SRAM) and is able to store a frame header comprising the first 40-bytes of the data frame and a frame pointer comprising a 13-bit entry. However, in alternative configurations, each individual queue 121 may be configured to store other amounts of data and the rules queue 120 may be configured to store other numbers of frame headers and frame pointers for each port, based on the particular network requirements. The IRC 40 also includes an IRC scheduler 122 to facilitate processing the frame headers in an efficient manner. In the exemplary embodiment, IRC scheduler 122 and rules queue 120 are part of the IRC 40. However, in alternative embodiments the IRC rules queue 120 and IRC scheduler 122 may be located external to the IRC 40 on another part of the switch 12 or even external to the switch 12.

According to the exemplary embodiment of the invention, the IRC 40 monitors the number of entries for each port that are stored in the rules queue 120. When a queue for an individual receive port has three entries, the IRC 40 signals flow-control/back-pressure logic associated with that receive port in order to regulate network activity, the details of which are not disclosed herein in order not to unduly obscure the thrust of the present invention.

Figure 5:
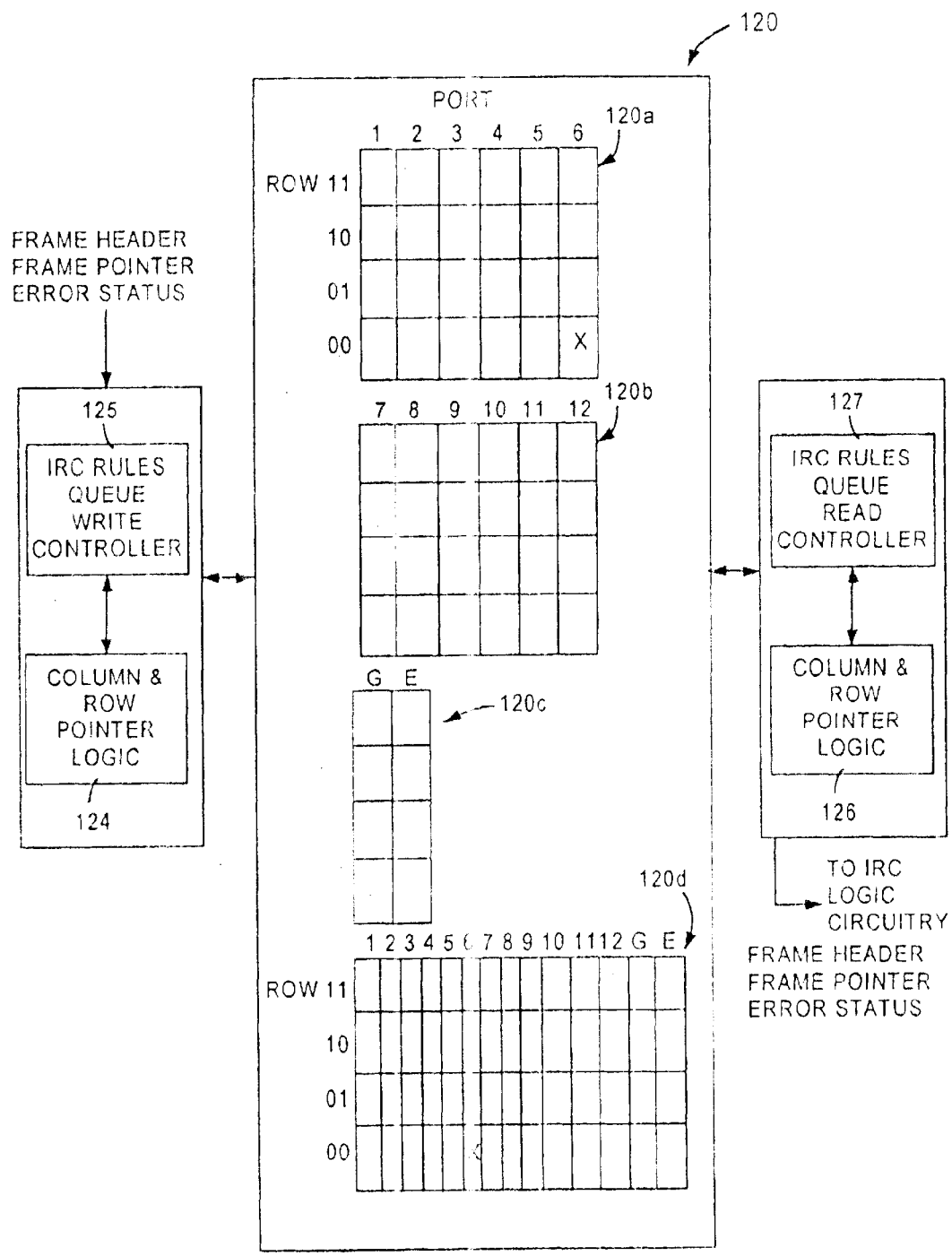
FIG. 5 is a detailed block diagram of the IRC rules queue in accordance with an embodiment of the present invention.

FIG. 5 is a detailed block diagram illustrating the structure of the rules queue 120 of FIG. 4, according to an exemplary embodiment of the present invention. Referring to FIG. 5, rules queue 120 includes four memory blocks 120a–120d, with each of the memory blocks being formed on an SRAM device. Memory block 120a stores up to four frame headers for each of receive ports 1–6. Memory block 120b stores up to four frame headers for each of receive ports 7–12 and memory block 120c stores up to four frame headers for each of the gigabit and expansion ports. Memory block 120d stores up to four frame pointers for each of ports 1–12 and for each of the gigabit and expansion ports. In alternative embodiments, the rules queue 120 may have other configurations, e.g., a single memory block, based on the particular network requirements while taking into account space constraints on the multiport switch 12.

As discussed previously, the multiport switch 12 receives incoming data frames and the corresponding receive MAC stores the frame in an internal FIFO. The scheduler 80, shown in FIG. 3, then grants write access to the queuing logic 74 to initiate a transfer over write bus 69a during a time slot scheduled for that particular port. The respective queuing logic 74, after receiving the grant for access to the write bus 69a and after the receive FIFO has captured at least 64-bytes of a frame, begins the transfer of data in a direct memory access (DMA) transaction during the assigned time slot. The queuing logic 74 begins the transfer by transmitting a write strobe signal (WR) and a Start of Frame (SOF) signal onto write bus 69a. In the exemplary embodiment of the invention, the SOF signal is asserted during the transfer of the first 8-bytes of data from the receive FIFO to the SSRAM interface 78 and the WR signal is asserted during the transfer of the entire data frame. The IRC 40 then stores the frame header information in the rules queue 120, as described in more detail below.

Figure 6:
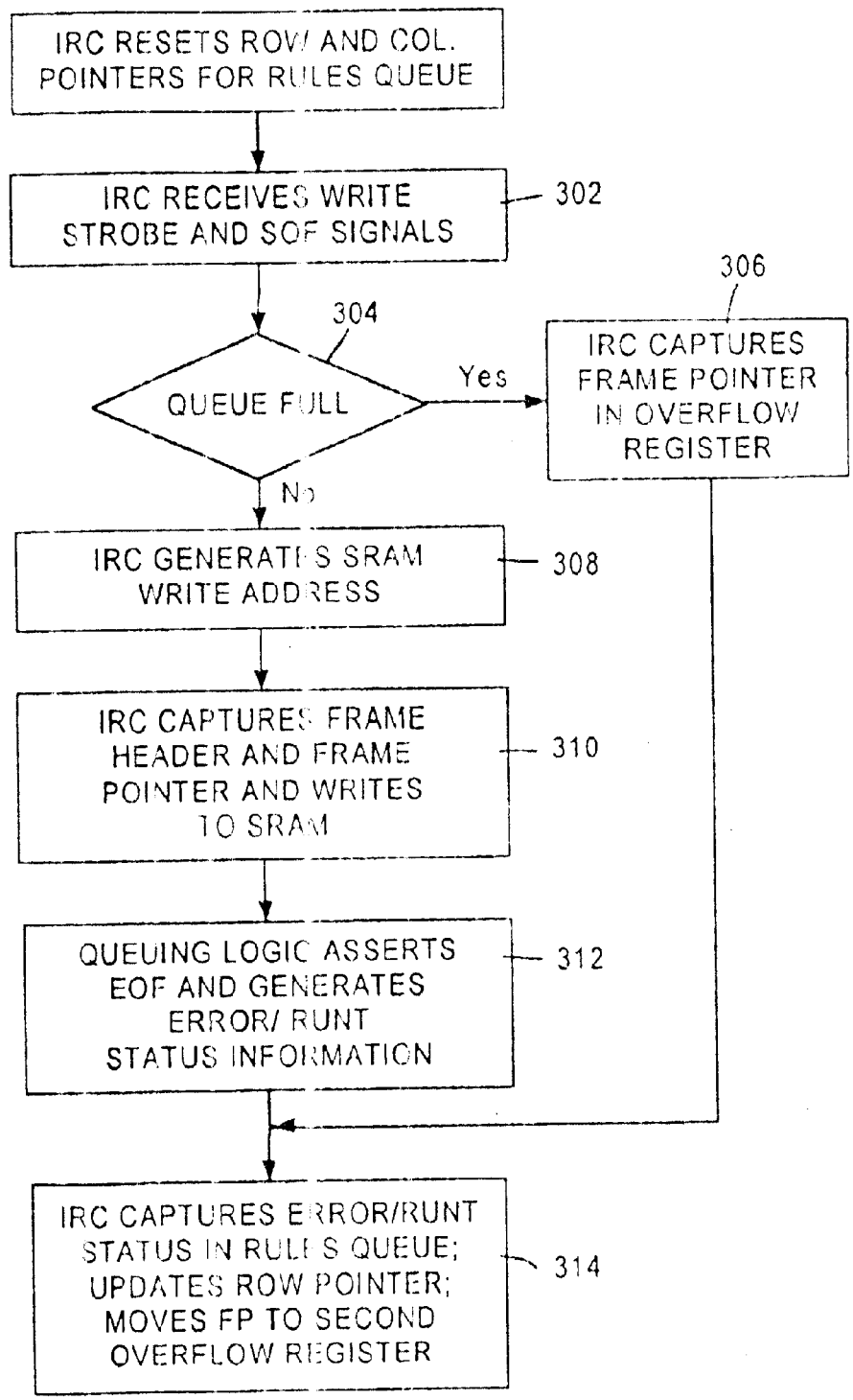
FIG. 6 is a flow diagram illustrating the method of storing frame header information in a network switch according to an embodiment of the present invention.

FIG. 6 is a flow diagram illustrating the method for storing the frame header and frame pointer information, according to an exemplary embodiment of the invention. At step 300, upon power-up or initialization, the IRC 40 resets the write pointers associated with writing data to the rules queue 120. As illustrated in FIG. 5, the IRC 40 includes column and row pointer logic 124 to enable the IRC rules queue write controller 125 to write data to the memory blocks 120a–d. According to the exemplary embodiment of the invention, the IRC 40 includes separate column and row write pointers. Additionally, in the exemplary embodiment of the invention, the row pointers associated with writing both the frame headers and frame pointers to memory blocks 120a–d are implemented as gray code counters. Advantageously, using gray code counters ensures that any asynchronous write operations to memory blocks 120a–d does not result in erroneous operations due to multiple bit transitions that may otherwise occur in counters using binary-format representations.

Next, at step 302, the IRC 40 receives the write strobe signal and the SOF signal via data bus 69a. These signals alert the IRC 40 that a write to external memory interface 44 is underway and allows the IRC 40 to capture the frame header and frame pointer information.

The IRC 40 at step 304 then determines whether the particular queue, corresponding to the queuing logic 74 that is transmitting the data frame, is full. That is, the IRC 40 determines whether four frames are already stored in the queue associated with the captured frame header. When the particular queue is full, the IRC 40 stores the frame pointer information in a first overflow register, at step 306.

When the IRC 40 determines that the queue is not full, the IRC rules queue write controller 125 generates an SRAM write address to write the frame header and frame pointer to the appropriate locations in memory blocks 120a–d, at step 308. For example, suppose that a frame received on port 6 is being transmitted to external memory interface 44. With reference to FIG. 5, the IRC rules queue write controller 125 generates a write address corresponding to the location in memory block 120a reserved for frame headers for port 6. Assuming that no frames have been written into the queue associated with port 6, the IRC rules queue write controller 125 generates a row address corresponding to the location designated by row "00" and a column address corresponding to the columns reserved for port 6, schematically shown by the "X" in FIG. 5. The IRC rules queue write controller 125 also generates a write address corresponding to the location in memory block 120d reserved for the frame pointers associated with port 6, also shown schematically by an "X" in FIG. 5.

Next, at step 310, the IRC 40 captures the first 40 bytes of the data frame being transmitted to external memory interface 44 along with the frame pointer and writes the data to the locations in memory blocks 120a–d, specified by the column/row pointer logic 124.

After a data frame has been completely transferred to external memory 36, the queuing logic 74 asserts an End of Frame (EOF) signal and generates status information indicating whether the frame was received at the multiport switch 12 with errors or whether the frame is a runt, at step 312. More specifically, when the queuing logic 74 detects an error in the received data, the queuing logic 74 asserts an error signal over write bus 69a. Additionally, when the queuing logic 74 detects that the received frame was a runt frame, the queuing logic 74 generates a runt status indication over write bus 69a. The IRC 40 receives the error/runt status signal and stores an error/runt indication in the rules queue 120 with the corresponding frame header, at step 314. When the frame with the error or the runt frame is later processed by the IRC 40, the IRC 40 creates a forwarding descriptor with a null port vector so that the frame will be discarded.

After the error/runt status indication has been captured and stored with the frame header information, the IRC 40 updates the row pointer associated with the particular queue just written so that the subsequent frame header will not overwrite the recently stored frame header. Additionally, when an overflow occurred at step 306, the IRC 40 moves the frame pointer from the first overflow register to a second overflow register for later processing by the IRC 40.

In the manner described above, the multiport switch 12 is able to store frame header and frame pointer information in the rules queue memory blocks in an efficient manner for processing by the IRC logic circuitry. According to the exemplary embodiment of the invention, the rules queue memory blocks 120a–d are each dual port devices that enable data to be read from the memory blocks simultaneously with the writing of data to the memory blocks. Advantageously, this enables the frame headers to be processed in an efficient manner by the IRC 40 to maximize data throughput. The IRC scheduler 122 coordinates the processing of the data from the rules queue 120, as described in detail below.

Figure 7:
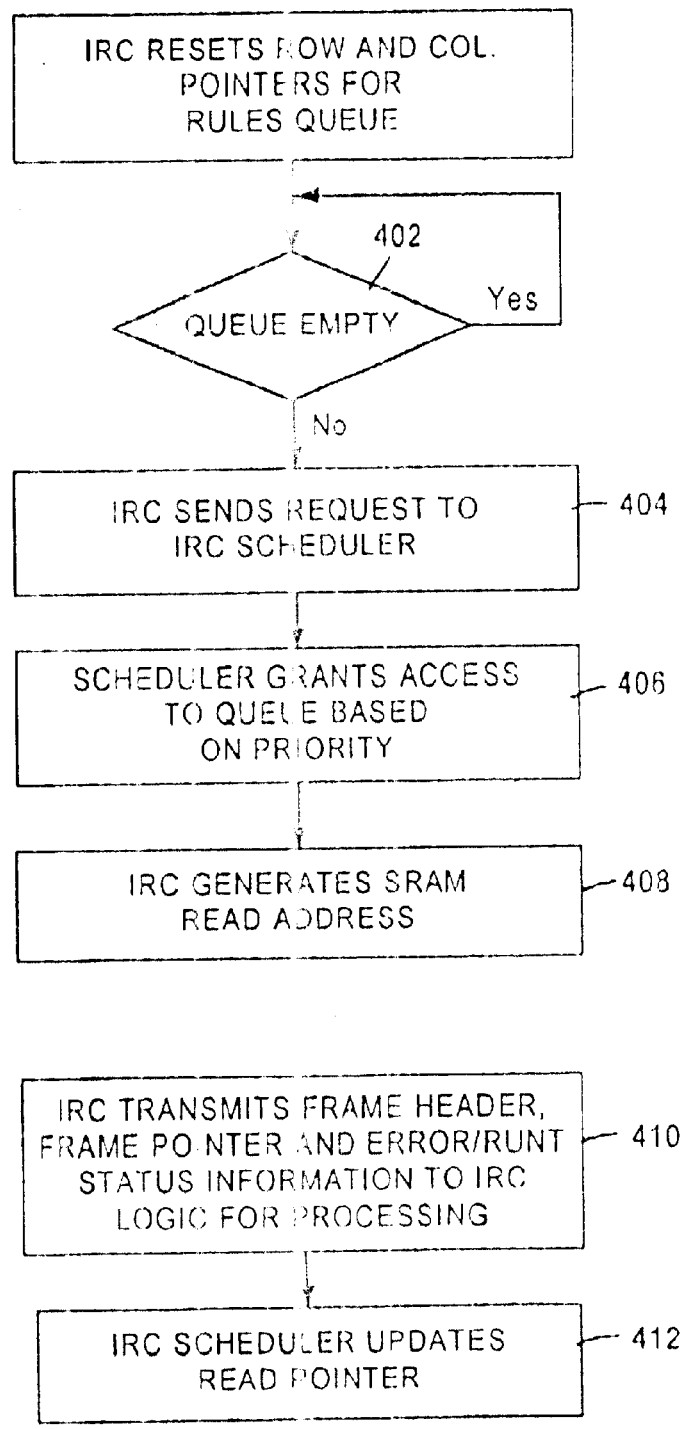
FIG. 7 is a flow diagram illustrating the method of reading frame header information according to an embodiment of the present invention.

FIG. 7 is a flow diagram illustrating the method for reading data from the rules queue 120, according to an exemplary embodiment of the invention. At step 400, upon initialization or power-up, the IRC 40 resets all read pointers associated with reading data from the rules queue 20. As illustrated in FIG. 5, the IRC 40 includes column and row pointer logic 126 to enable the IRC rules queue read controller 127 to read from memory blocks 120a–d. According to the exemplary embodiment of the invention, the IRC 40 includes separate column and row read pointers. Additionally, in the exemplary embodiment of the invention, the row pointers associated with reading both the frame headers and frame pointers in memory blocks 120a–d are implemented as gray code counters. Advantageously, using gray code counters ensures that any asynchronous read operations from memory blocks 120a–d does not result in erroneous operations due to multiple bit transitions that may otherwise occur in counters using binary-format representations.

Next, at step 402, the IRC 40 determines whether the rules queue 120 is empty. When the rules queue 120 is not empty, the IRC 40 sends a read request to IRC scheduler 122, at step 404.

The IRC 40 processes the read requests from rules queue 120 according to predetermined priority, at step 406. More specifically, the frame headers from each particular queue are transferred to the IRC logic circuitry in successive time slots. The IRC scheduler 122 provides arbitration between the queues to allocate a time slot, during which time data from a given queue 121 will be transferred to the IRC logic circuitry. In particular, when a queue 121 has data to be processed by the IRC logic circuitry, the queue sends a request for a time slot to the IRC scheduler 122. In response, the IRC scheduler 122 produces grant signals supplied to the rules queue 120 to enable transfer of data to the IRC logic circuitry.

Figure 8:
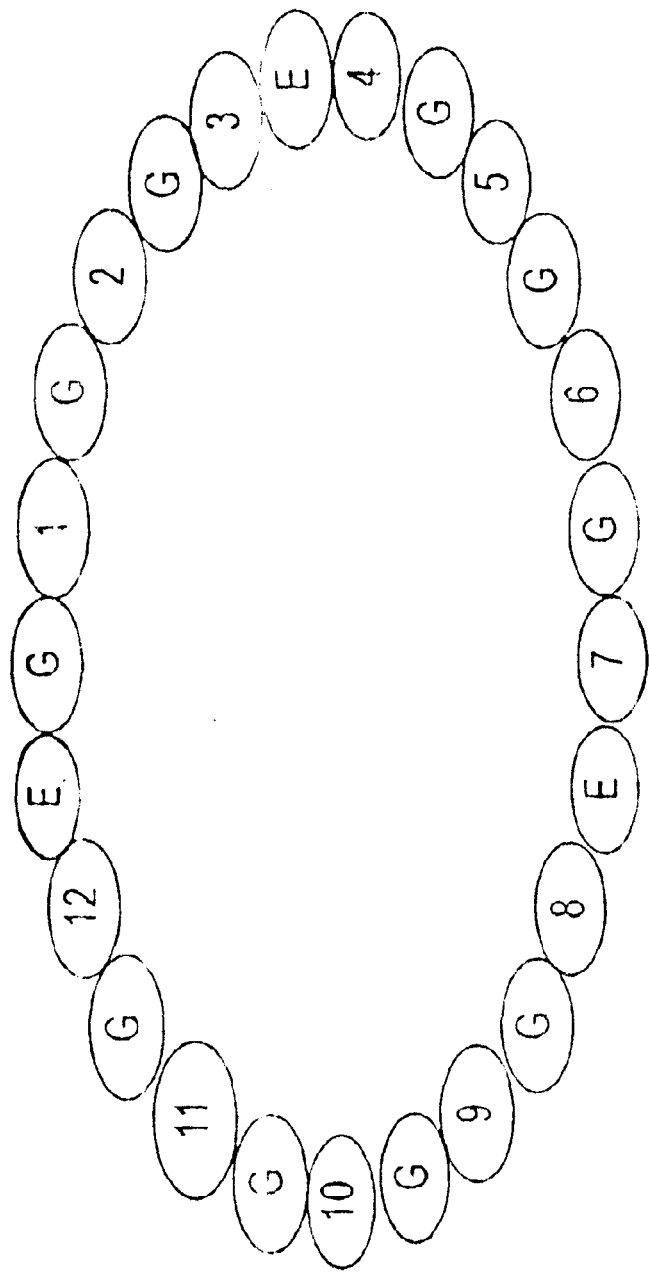
FIG. 8 is a diagram illustrating time slots assigned to various ports of the switch according to an embodiment of the present invention.

Each of the queues for a receive port is initially assigned at least one time slot in each scheduling cycle of the IRC scheduler 122. FIG. 8 illustrates an exemplary scheduling cycle of the IRC scheduler 122 having 25 time slots for the rules queues 120. Each time slot may be equal to five clock cycles. One time slot may be assigned to each queue representing the 10/100 MAC ports 1–12, 10 time slots may be assigned to the queue representing the gigabit MAC port 24, and 3 time slots may be assigned to the queue that supports the expansion port 30.

As shown in FIG. 8, the time slots in the scheduling cycle are arranged as follows: G1G2G3E4G5G6G7E8G9G10G11G12E, where G indicates the time slots assigned to the queue that represents the gigabit MAC port 24, E indicates the time slots assigned to the queues that support the expansion port 30, and numerals 1 to 12 indicate the time slots assigned to the queues representing the 10/100 Mb/s ports 1 to 12, respectively. Thus, the first time slot in the scheduling cycle may be assigned to the queue that represents the gigabit MAC port 24 (G), the second time slot may be assigned to the queue that supports the MAC port 1, the third time slot may be assigned to the queue representing the gigabit MAC port 24 (G), etc. Finally, the last time slot in the scheduling cycle may be assigned to the queue supporting the expansion port 30.

Each individual port has a priority in accessing the time slots assigned to that port. Hence, when a queue for a given port requests the time slot assigned to that port, its request is granted, even if the other queues request time slots. However, when no frame headers are supplied to the IRC 40 from a port assigned with a current time slot, the bandwidth allocated to that port would be wasted, whereas processing of frame headers from the overloaded ports might be delayed because the bandwidth allocated to them is not sufficient.

In accordance with the present invention, the IRC scheduler 122 avoids such problems and provides a system for dynamically allocating time slots to the rules queue 120. The IRC scheduler 122 operates in a free-running mode to allocate successive time slots to the queues representing various ports. When the IRC scheduler 122 performs arbitration for access to a current time slot, it detects whether or not the queue assigned with the current time slot requests a time slot. If a request from this queue is detected, then the IRC scheduler 122 allocates the current time slot to the queue assigned with the current time slot. For example, if the IRC scheduler 122 allocates the first time slot in the scheduling cycle illustrated in FIG. 8, it detects whether the queue representing the gigabit MAC port 24 requests a time slot. If a request from this queue is detected, the IRC scheduler 122 allocates the first time slot to the queue representing the gigabit MAC port 24.

However, if no request from the current queue is detected, the IRC scheduler 122 skips to the queue assigned with the next time slot and detects whether that queue requests a time slot. If a request from the rules queue assigned with the next time slot is detected, the IRC scheduler 122 allocates the current time slot to that queue.

For example, if the queue representing the gigabit port 24 does not request a time slot, the IRC scheduler 122 detects whether the queue representing the 10/100 MAC port 1 requests a time slot. If a request from that queue is detected, the IRC scheduler 122 allocates the first time slot to the queue representing the 10/100 MAC port 1.

If no request from the next queue is received, the IRC scheduler 122 skips to the queue assigned with the following time slot. The IRC scheduler 122 detects whether a request for a time slot from the queue assigned with the following time slot is received, and if so, the current time slot is allocated to that queue. For example, if the queues representing the gigabit MAC port 24 and the 10/100 port 1 do not request a time slot, the first time slot is allocated to the queue representing the 10/100 port 2.

Hence the IRC scheduler 122 successively polls the queue assigned with time slots following the current time slot, and allocates the current time slot to the first queue that requests a time slot. Then, the IRC scheduler 122 proceeds to allocating the next time slot, and repeats the operation for the next time slot.

Thus, time slots assigned to queues representing underloaded ports are dynamically allocated to queues representing overloaded ports. Therefore, the present invention is able to increase efficiency of bandwidth utilization.

Once the IRC scheduler 122 grants access to the particular queue based on the arbitration scheme in step 406, the IRC rules queue read controller 127, at step 408, generates an SRAM read address corresponding to the location in memory blocks 120a–d where the current frame header and frame pointer to be processed are stored. Next at step 410, the IRC rules queue read controller 127 transmits the frame header and the error/runt status information along with the 13-bit frame pointer to the IRC logic circuitry for processing. After the data has been transferred, the IRC scheduler 122 updates the row read pointer, at step 412.

The IRC logic circuitry is then able to begin processing the frame header to generate the forwarding descriptor, as described in more detail below. Advantageously, the rules queue structure enables the present invention to store multiple frame headers on the multiport switch 12 while the data frame is stored in external memory. Another advantage of the present invention is that the memory devices used to store the frame headers each include both a write port and a read port to enable data to be written to and read from each memory device simultaneously. This enables data frames to be stored and processed in an efficient manner, thereby increasing data throughput as compared to typical prior art switches that transmit data frames to external memory devices.

INTERNAL RULES CHECKER LOGIC CIRCUITRY

Figure 9:
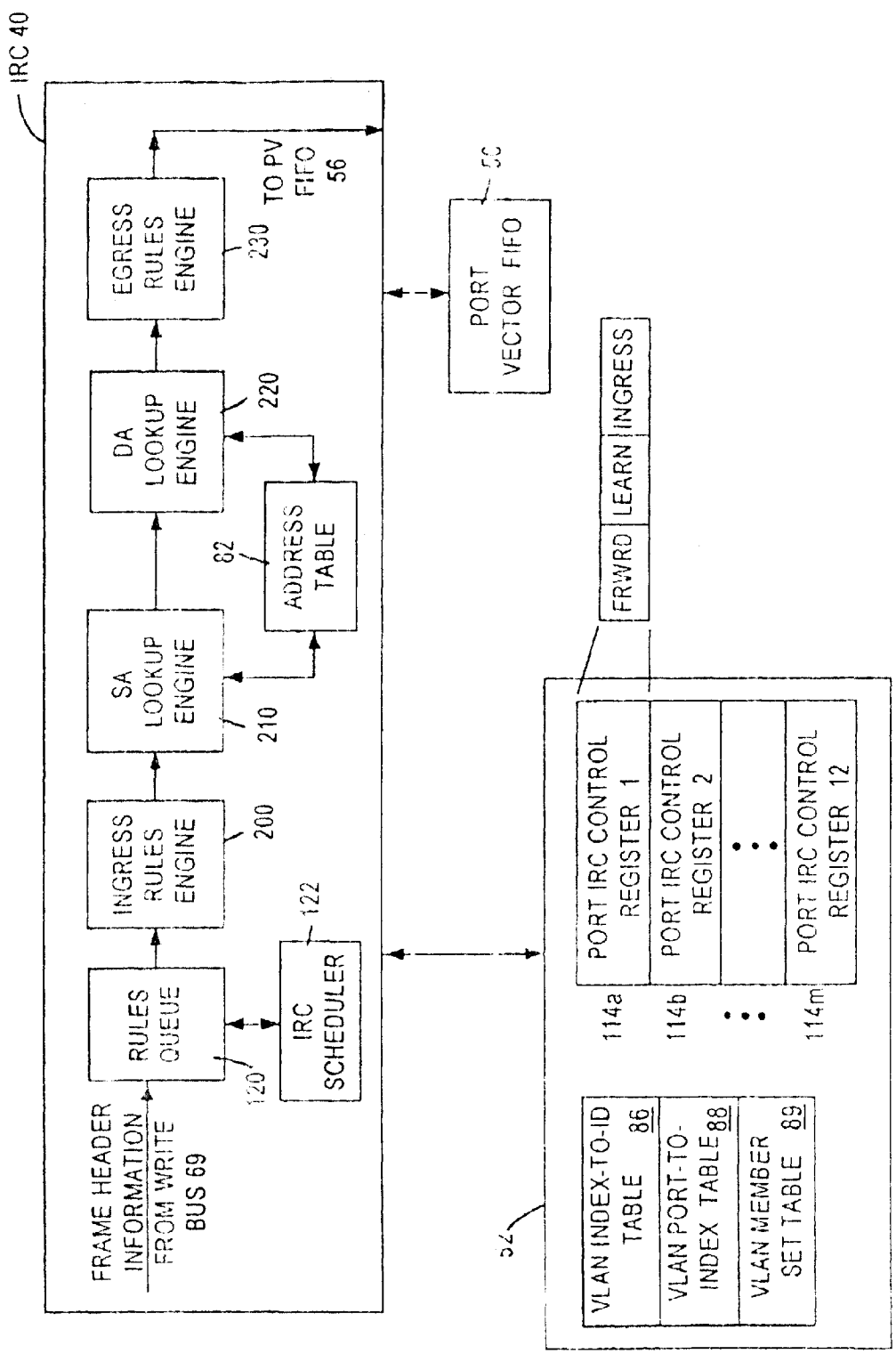
FIG. 9 is a block diagram of a system including the internal rules checker in accordance with an embodiment of the present invention.

According to the exemplary embodiment, the IRC logic circuitry for processing the frame header and frame pointer information includes four functional logic blocks, an ingress rules engine 200, a source address (SA) lookup engine 210, a destination address (DA) lookup engine 220 and an egress rules engine 230, as illustrated in FIG. 9. In the exemplary embodiment, the four engines 200, 210, 220 and 230 are employed as separate logic devices. In other words, each engine is designed in a modular fashion to receive input from other devices and to perform its particular functions without relying on processing logic from another logic engine. Advantageously, this modulator architecture allows changes to be made to any of the particular logic engines without affecting other parts of the decision making process. However, in alternative configurations, the individual functions performed by each logic engine, discussed in detail below, as well as the particular number of logic engines may be modified, based on the particular network requirements.

The IRC 40 also includes address table 82. However, in alternative embodiments, the address table 82 may be located outside the IRC 40 within another part of the multiport switch 12 or even external to the multiport switch 12. According to the exemplary embodiment, the address table 82 supports 4096 user addresses and capabilities for 64 unique virtual local area networks (VLANs). However, the number of addresses and VLANs supported may be increased by expanding the table size. VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network.

Figure 10:
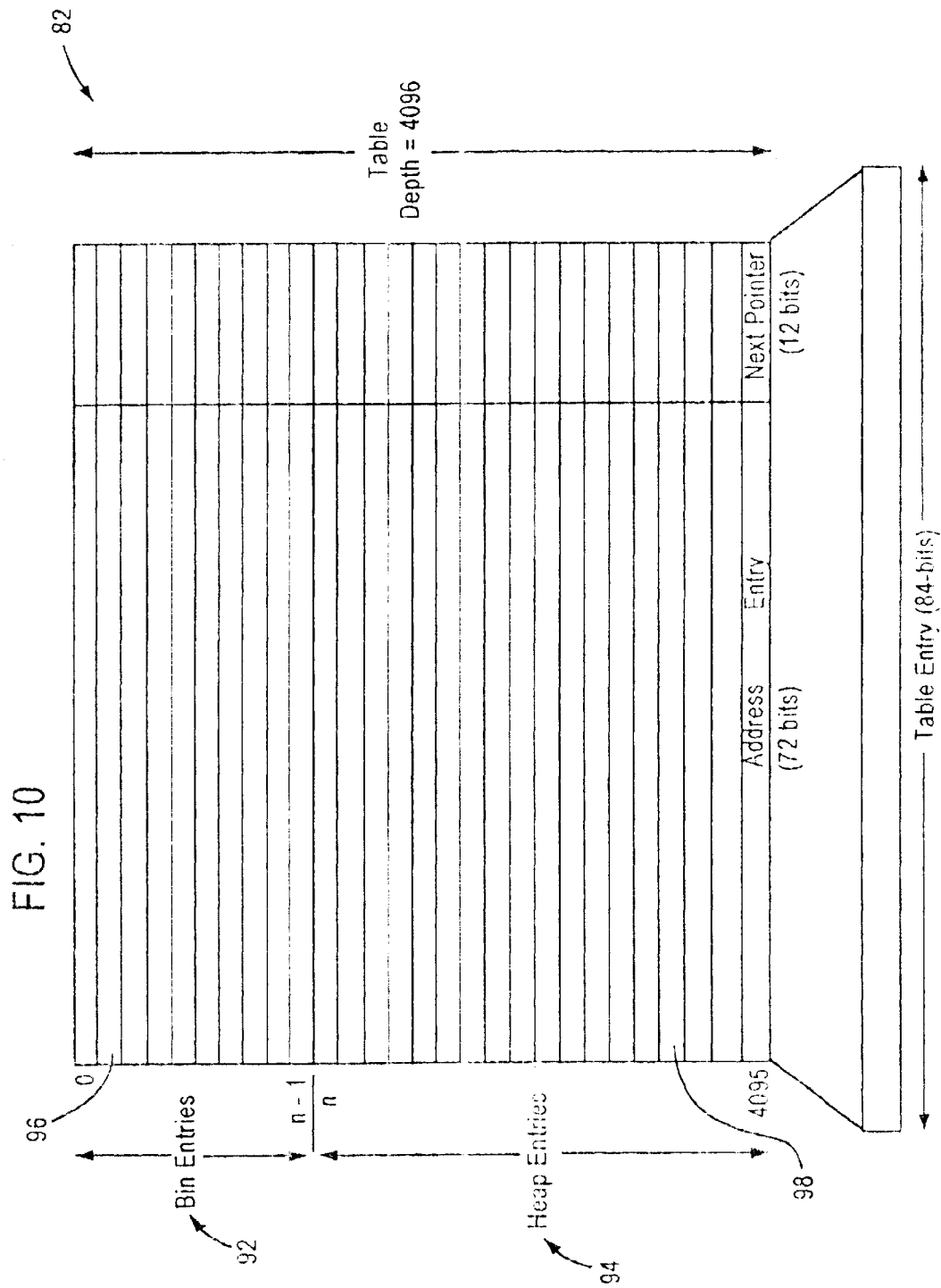
FIG. 10 illustrates the comparison of the IRC address table in accordance with an embodiment of the present invention.

FIG. 10 illustrates the organization of the IRC address table 82. The IRC address table 82 contains an array of 4096 entries. The first "n" entries 92 are referred to as "bin entries" and have addresses from "0" to "n−1". The remaining entries 94 are referred to as "heap entries" and have addresses from "n" to "4095". Each of the table entries includes a 72-bit address entry field and a 12-bit "next pointer" field.

Figure 11:
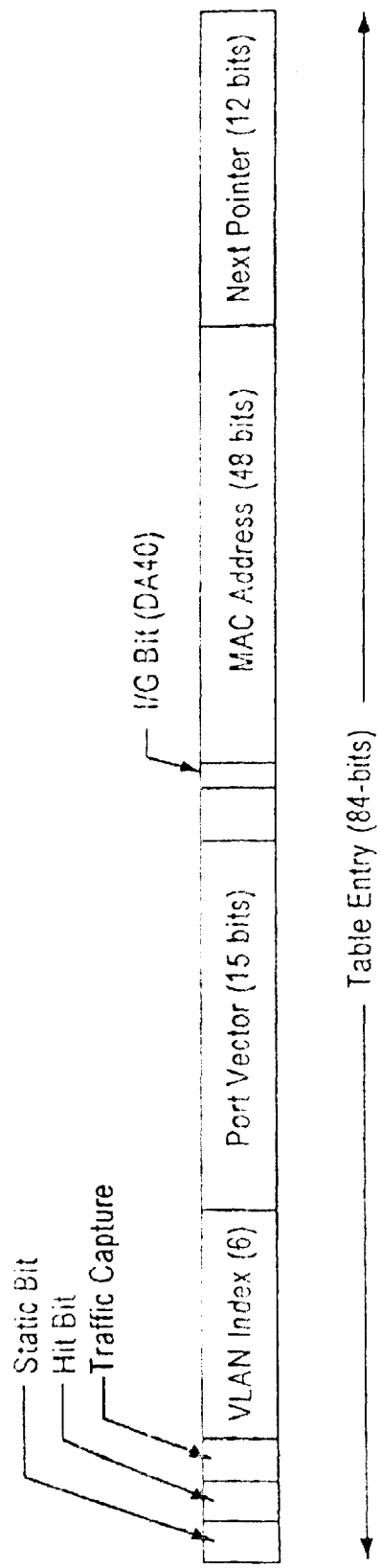
FIG. 11 illustrates the format of an IRC address table entry of the IRC address table of FIG. 10.

FIG. 11 illustrates the composition of each 84-bit table entry shown in FIG. 10. The hit bit is used for address entry "aging" to delete entries from the address table 82 that have not been used in a predetermined amount of time. The static bit is used to prevent deletion of an address entry.

The traffic capture bit identifies traffic capture source and destination MAC addresses for mirroring MAC conversations to the management queue 68.

The VLAN index field is a 6-bit field used to reference a 12-bit VLAN identifier (ID). The VLAN index-to-VLAN ID table 86, shown in FIG. 9, contains the mapping associations. The switch 12 receives both tagged and untagged frames. When the switch 12 receives untagged data frames, i.e., without VLAN tag information, the IRC 40 assigns a VLAN index from the VLAN port-to-index table 88, shown in FIG. 9, based on the receive port on which the frame is received. The VLAN index-to-ID table 86 and the VLAN port-to-index table 88 are located with the configuration and status registers 52. However, in alternative configurations, the tables 86 and 88 may be located within the IRC 40.

The port vector is a 15-bit field that provides a forwarding descriptor with a vector identifying the port(s) to which the frame should be forwarded.

The MAC address field is a 48-bit field that includes addresses for both source addresses and destination addresses. The addresses can be unicast, multicast or broadcast. An individual/group (I/G) bit is also included in the MAC address field.

In the exemplary embodiment of the present invention, the host CPU 32 functions as the management entity and is connected to the IRC 40 via the CPU IF 50. Alternatively, a management MAC may be connected to the CPU IF 50 to function as the management entity.

The host CPU 32 is responsible for initializing the values in the address table 82. Upon power-up, the host CPU 32 loads values into the bin entries 92 based on the network configuration, including VLAN configurations. The IRC 40 uses the specific fields of the address table 82 to make frame forwarding decisions when frames are received in the switch 12. More specifically, the IRC 40 uses engines 200–230 to generate frame forwarding information and to create a forwarding descriptor for output to the port vector FIFO 56.

Logic engines 200–230, as discussed previously, are separate logic devices and are able to process data frames in parallel, thereby increasing data throughput as compared to systems which employ a single decision making device. In other words, each logic engine is able to perform its respective processing on a different data frame simultaneously with the other respective logic engines. Advantageously, the data throughput of the multiport switch 12 including engines 200–230 may increase up to fourfold, as compared to a network switch that employs a single decision making device, since four data frames may be processed simultaneously. The operation of each logic engine, according to the exemplary embodiment, will be described below.

The ingress rules engine 200 performs a variety of pre-processing functions for each frame header. For example, ingress rules engine 200 checks to see if a data frame was received with errors by reading the frame status information stored with the respective frame headers in rules queue 120. When the ingress rules engine 200 determines that a receive error has occurred, the ingress rules engine 200 constructs a forwarding descriptor with a null port vector, e.g., a port vector with all zeros or some other predetermined value, that will cause the frame to be discarded. Optionally, frames with errors may be forwarded to the host CPU 32 for diagnostic purposes.

The ingress rules engine 200 also checks the source address of the received frame to determine whether the Individual/Group (I/G) bit is set. If the I/G bit is set, indicating a multicast source address, the ingress rules engine 200 handles the frame as if the frame was received with errors. That is, the ingress rules engine 200 creates a forwarding descriptor with a null port vector.

The ingress rules engine 200 also checks the destination address (DA) of the frame to determine if the frame should be sent to the management entity, e.g., host CPU 32. Specifically, the ingress rules engine 200 looks for Bridge Protocol Data Units (BPDUs), Generic Attribute Registration Protocol (GARP) frames, MAC Control Frames and frames with certain Physical MAC addresses. The ingress rules engine 200 identifies these types of frames based on their specific destination address information.

When the ingress rules engine 200 detects a match with one of the above DAs, the ingress rules engine 200 constructs a forwarding descriptor identifying the management port as the forwarding port.

The ingress rules engine 200 also determines whether SA and DA lookups will be performed by engines 210 and 220, respectively, based on whether learning and forwarding are set in the respective port IRC control registers 114a–m, illustrated in FIG. 9. According to the exemplary embodiment of the invention, the multiport switch 12 includes one port IRC control register 114 for each of the twelve 10/100 Mb/s ports and for the 1 Gb/s port. In alternative configurations, a single register could be used to store the appropriate control information for the respective ports.

Referring to FIG. 9, each port IRC control register 114 includes a learn bit and a forward (frwrd) bit. A set learn bit allows the IRC to "learn" unknown MAC source addresses received by the corresponding port, i.e., add new entries not stored in address table 82. A set frwrd bit allows frames received by the corresponding port to be forwarded to other ports and allows frames received by other ports to be transmitted from this port.

When learning is set and forwarding is not set in the port IRC control register 114 corresponding to the port on which the frame was received, only the SA lookup is performed. That is, the SA lookup is performed so that a new entry may be added to the address table 82 and the SA lookup engine 210 generates a forwarding descriptor with a null port vector. When learning and forwarding are both set in the port IRC control register 114 corresponding to the receive port, both SA and DA lookups are performed, as discussed in more detail below. When learning and forwarding are both clear in the port IRC control register 114 corresponding to the receive port, neither the SA nor DA lookups is performed. In this case, the ingress rules engine 200 generates a forwarding descriptor with a null port vector, which is transmitted directly to the port vector FIFO 56.

Optionally, the ingress rules engine 200 performs VLAN ingress filtering to prevent the multiport switch 12 from forwarding a frame that does not belong to a VLAN associated with the receiving port. The port IRC control registers 114 each include an ingress bit which, when set, indicates that ingress filtering is enabled. Ingress filtering according to the exemplary embodiment of the present invention proceeds as follows.

Initially, the ingress rules engine 200 determines whether a received frame has no VLAN tag header of if the VLAN tag header has a VLAN ID equal to "0". When the frame has no VLAN tag header or the VLAN ID is "0", the ingress rules engine 200 does not perform ingress filtering regardless of the state of the ingress bit. Otherwise, the ingress rules engine 200 retrieves the VLAN index corresponding to the frame's VLAN ID from the VLAN index-to-ID table 86. If the frame's VLAN ID is not found in this table, the ingress rules engine 200 forwards the frame to the management port only.

Next, the ingress rules engine 200 determines whether the received frame belongs to a VLAN associated with the receiving port. According to the exemplary embodiment, the multiport switch 12 includes a VLAN member set table 89, illustrated in FIG. 9, that indicates which VLANs are associated with each port. The VLAN member set table 89 includes fifteen 64-bit entries corresponding to ports 0–14, i.e., the management port, 12 MAC ports 20, 1 Gb/s port 24 and expansion port 30, respectively. Each 64-bit entry contains a bit map that indicates which VLAN identifiers are associated with the corresponding port. For example, if bit "n" of the entry corresponding to port "x" is set, port x is in the member set for the VLAN whose index is n. VLAN index n in turn identifies a VLAN ID in the VLAN index-to-ID table 86.

The ingress rules engine 200 examines the bit that corresponds to the VLAN index in the VLAN member set table 89 for the entry that corresponds to the receiving port. When this bit is "0", indicating that the frame does not belong to a VLAN associated with the receiving port, the ingress rules engine 200 generates a forwarding descriptor with a null port vector so that the frame will be discarded. In this manner, the ingress rules engine 200 prevents a frame that does not belong to a VLAN associated with the receiving port from being forwarded.

After processing by ingress rules engine 200, the IRC 40 performs SA and DA searches of address table 82, based on whether learning and forwarding are enabled as discussed above. The multiport switch 12 needs to make frame forwarding decisions relatively quickly, since multiple data frames may be received by the multiport switch 12 simultaneously. Hence, in the exemplary embodiment of the present invention, a hashing scheme is used to search only a subset of the address entries, as described below. The memory structure of FIG. 10 provides an indexed arrangement, where a given network address will be assigned to a corresponding bin. In other words, each bin entry 96 is configured to reference a plurality of table entries (i.e., heap entries) 98. Hence, the SA lookup engine 210 performs a search of the address table 82 by first accessing a specific bin 96 pointed to by a hash key, and then searching the entries within (i.e., referenced by) the corresponding bin to locate the appropriate match.

Each bin entry 96 is the starting point for the search by the SA lookup engine 210 for a particular address within the address table 82. A bin entry may reference no addresses (i.e., be empty), may reference only one address within the bin entry location, or may reference a plurality of addresses using a linked list chain structure.

Figure 12:
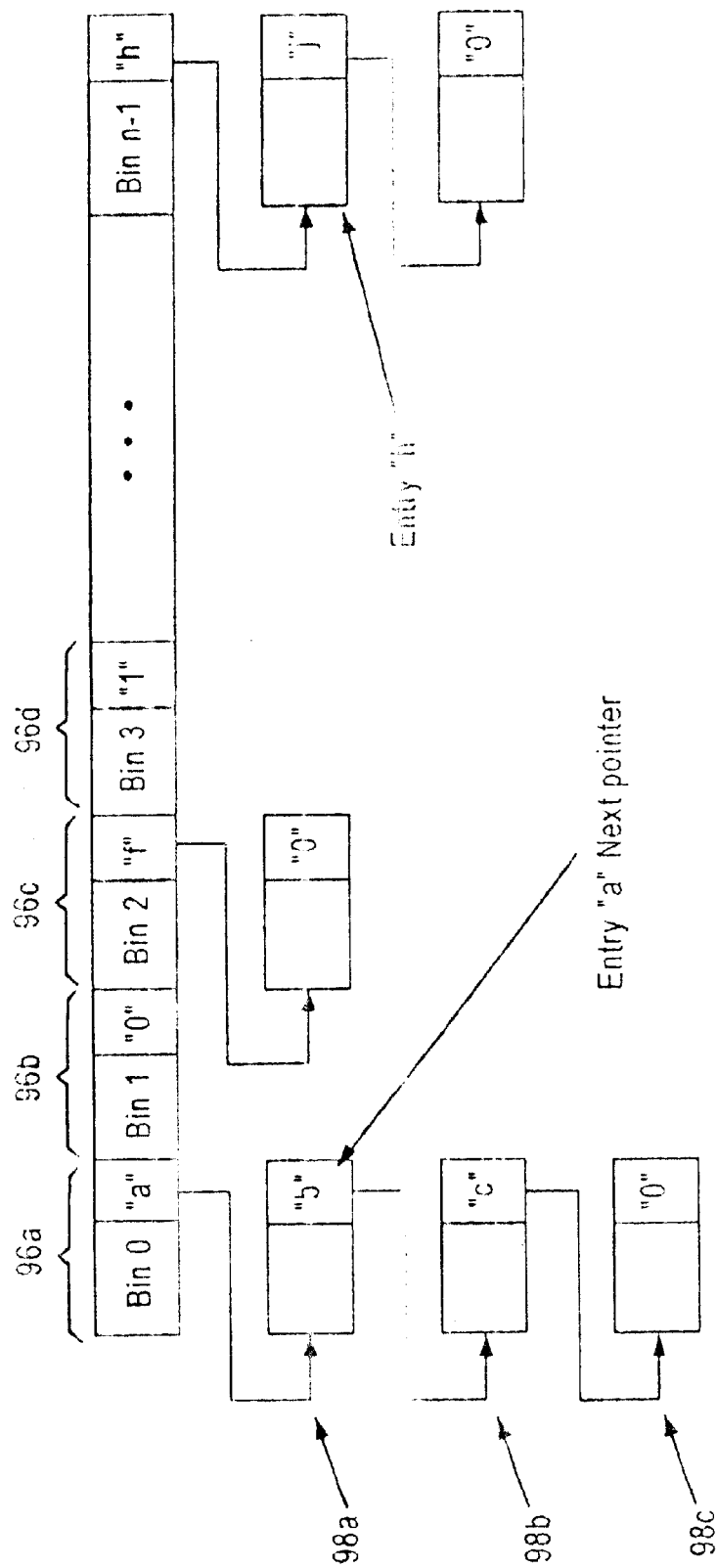
FIG. 12 illustrates linked list chains for identifying table entries relative to a selected bin.

FIG. 12 is a diagram illustrating bin entries referencing a different number of table entries. Each of the bin entries 96 and heap entries 98 includes the 72-bit address entry and a 12-bit "next pointer" field. The "next pointer" field associated with the bin entry 96 identifies the location of the next entry in the chain of linked list addresses. For example, Bin 3, 96d, of FIG. 9 does not have any associated table entries. In such a case, the 72-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 12. Thus, the first entry of Bin 0 is stored in the address entry field of the bin entry 96a and the next entry (heap entry 98a) is referenced by address entry "a" in the next pointer field of the bin entry 96a.

Figure 13:
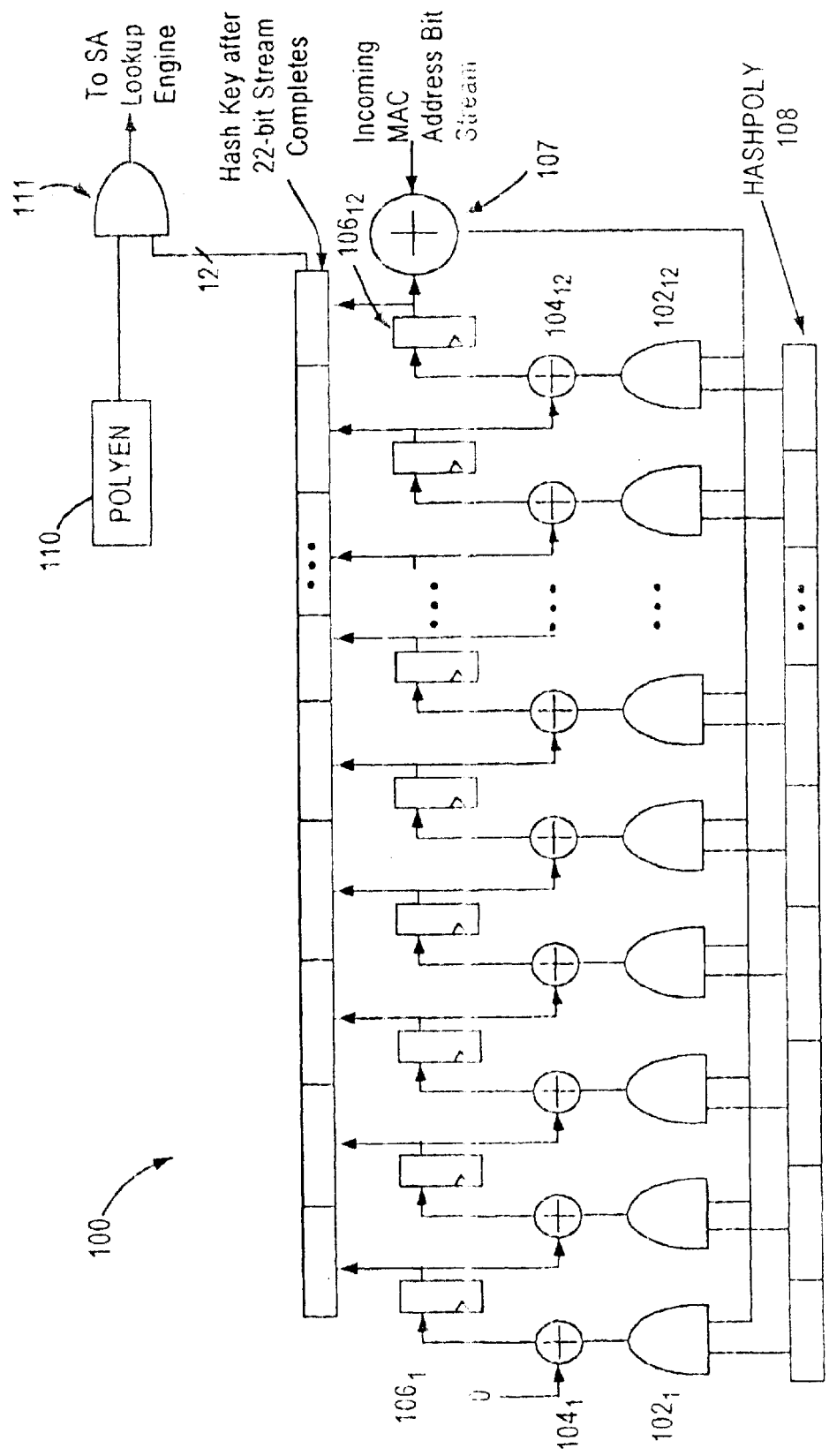
FIG. 13 illustrates a hash function circuit used with the internal rules checker.

The SA lookup engine 210 performs hash searches of the IRC address table 82 to find entries associated with the source address and VLAN index of a received data frame. FIG. 13 is a block diagram illustrating an exemplary hash function circuit 100 used in conjunction with the SA lookup engine 210 in accordance with an embodiment of the present invention. The hash function circuit 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function circuit 100. Exemplary hash polynomials for the hashing function of the present invention are $x^{12}+x^7+x^4+x^3+1$, which has a HASHPOLY of 0000 1001 1001, and $x^{12}+x^6+x^4+x+1$, which has a HASHPOLY of 0000 0101 0011. The $x^{12}$ term is assumed to always equal "1", and therefore is not stored in the HASHPOLY register 108. Other polynomials may also be used for HASHPOLY based on the particular design requirements.

The hash function circuit 100 generates the hash key using the source address of the data packet according to a user-specified hash function. Initially, the IRC controller 82 concatenates the 16 least significant bits of the source address of the data packet with the VLAN index to create a search key. After the entire search key has been processed, the hash function circuit 100 outputs a 12-bit hash key.

From the 12-bit hash key, the SA lookup engine 210 calculates a bin number for searching the appropriate bin list in address table 82. More particularly, the SA lookup engine 210 uses the lower POLYEN bits of the hash key to generate the bin number. The bin number falls in the range of [0, n−1] where n=$2^{POLYEN}$ and the value of POLYEN is programmed by the host CPU 32 and stored in register 110. The hash key output by the hash function circuit 100 is provided to a logic circuit, for example a 12-bit parallel AND gate 111, that selectively outputs the lower significant bits of the hash key based upon a polynomial enable value (POLYEN) stored in register 210. The field "POLYEN" defines how many bits of the hash key are used to create the bin number. For example, if POLYEN=5, then the SA lookup engine 210 uses the lower five bits of the hash key. Hence, the hash key output by the logic circuit 100 is based upon masking the 12-bit hash key using the stored register value POLYEN in register 110.

After the bin number is calculated, the SA lookup engine 210 searches the bin list of the particular bin for an address entry whose address and VLAN index fields match the source address (SA) and VLAN index of the received frame.

If the SA lookup engine 210 finds an address entry whose address and VLAN index match the SA and VLAN index of the frame, the SA lookup engine 210 sets the hit bit for that address entry. Optionally, the hit bit may be used for address entry aging. If the SA lookup engine 210 does not find a match and learning is enabled, the SA lookup engine 210 constructs a new entry in the IRC address table 82 using the information from the received frame. After the SA lookup engine 210 completes the search and adds a new entry, if necessary, the DA lookup engine 220 performs a search of the address table 82, assuming that forwarding is set in the corresponding port IRC control register 114. Specifically, the DA lookup engine 220 searches the address table 82 for an address entry whose address and VLAN index match the destination address (DA) and VLAN index of the frame. The DA lookup engine 220 uses the 12-bit hash function circuit 100, illustrated in FIG. 13, to generate a 12-bit hash key for the DA/VLAN index search. The DA lookup engine 220 uses the lower POLYEN bits of the hash key to calculate the bin number in the address table 82. The DA lookup engine 220 then searches the appropriate bin list for a DA/VLAN index match in the address table 82. If a match is found, the DA lookup engine 220 uses the port vector field of the address entry and passes the port vector field information to the egress rules engine 230. When the DA lookup engine 220 cannot find a DA/VLAN index match, the frame must be "flooded" to all members of the VLAN. In this case, the DA lookup engine 220 sets the port vector to indicate that all ports are to transmit the frame.

After, the DA lookup engine 220 generates the port vector, the egress rules engine 230 receives the port vector information along with the receive port number and VLAN ID information. The egress rules engine 230 then creates a forwarding descriptor for the frame, as discussed in detail below.

Figure 14:
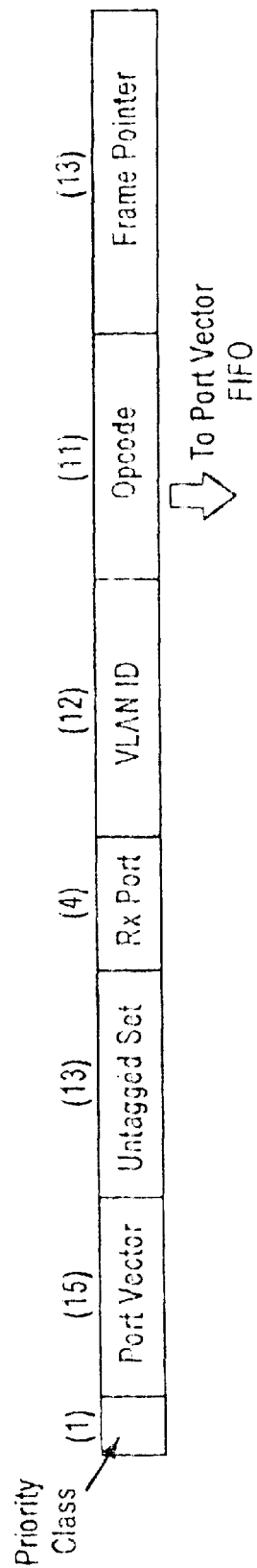
FIG. 14 illustrates the composition of the forwarding descriptor in accordance with an embodiment of the present invention.

FIG. 14 illustrates the composition of the forwarding descriptor according to an embodiment of the present invention. Referring to FIG. 14, the priority class field is a one-bit field that indicates the output priority queue in which the frame pointer should be placed, e.g., high priority or low priority.

The port vector field is a 15-bit field that identifies each port(s) that should receive the data frame for transmission to its destination address. Bit 0 of the port vector field corresponds to Port 0 (the management port), bits 1–12 correspond to MAC ports 1–12 respectively (the 10/100 Mb/s ports), bit 13 corresponds to the gigabit port 24 and bit 14 corresponds to the expansion port 30.

The untagged set field is a thirteen-bit field that indicates which ports should remove VLAN tag headers before transmitting frames. The untagged set is obtained from an untagged set table. The Rx port is a four-bit field that indicates the port from which the frame was received.

The VLAN ID field is a 12-bit field that includes the VLAN identifier associated with the frame. The opcode is an 11-bit field that contains instructions about how the frame should be modified before transmission and information that the host CPU 32 can use for processing frames from the management queue. The frame pointer is a 13-bit field that contains the location of the frame stored in external memory 36.

When VLAN ingress filtering is set, the egress rules engine 230 performs VLAN member set checking. The egress rules engine 230 performs this check by examining the bit that corresponds to the frame's VLAN index in the VLAN member set table entry that corresponds to the output port. If this bit is not set, the egress rules engine 230 masks that port from the port vector.

After the egress rules engine 230 generates the forwarding descriptor, the egress rules engine 230 outputs the forwarding descriptor to the port vector FIFO 56 for queuing, as shown in FIG. 3.

Described has been an apparatus and method for storing and processing frame header information in a network switch. An advantage of the invention is that frame header information is able to be stored on the multiport switch 12 and processed by a decision making engine in an efficient manner. Another advantage of the invention is that the multiport switch 12 is able to store frame headers and process frame headers simultaneously to maximize efficiency and increase the data throughput.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A multiport switch configured for controlling communication of data frames between stations, comprising:
 a plurality of receive devices corresponding to ports on the multiport switch, each of the receive devices configured to receive data frames and transmit the data frames on an internal bus to an external memory interface;
 a plurality of queues corresponding to ports on the multiport switch, the plurality of queues formed on a memory device that includes a write port and a read port to enable data to be written to and read from the memory device simultaneously, wherein each of the plurality of queues is configured to store frame header information received via the write port;
 a scheduler configured to allocate time slots to the plurality of queues;
 a decision making engine configured to receive the frame header information in successive time slots via the read port and to generate data forwarding information; and
 a read controller configured to transfer frame header information from the plurality of queues to the decision making engine via the read port,
 wherein the scheduler is configured to allocate the time slots based on a predetermined priority and the read controller is configured to transmit frame header information to the decision making engine during the allocated time slots.

2. The multiport switch of claim 1, wherein the read controller is configured to transmit a request signal to the scheduler, the request signal indicating that a first queue has stored frame header information.

3. The multiport switch of claim 2, wherein:
 each of the plurality of queues is assigned at least one time slot in a scheduling cycle and the scheduler is configured to allocate the time slot assigned to the first queue when a request signal associated with the first queue has been received, and
 the read controller is configured to transmit the frame header information from the first queue to the decision making engine during the allocated time slot.

4. The multiport switch of claim 1, wherein the frame header information comprises a source address and destination address of the data frame.

5. The multiport switch of claim 4, wherein the frame header information includes virtual local area network (VLAN) information.

6. The multiport switch of claim 1, wherein the memory device comprises a plurality of synchronous random access memory (SRAM) devices and each SRAM device includes a write port and a read port to enable data to be written to and read from each SRAM device simultaneously.

7. In a multiport switch that controls communication of data frames between stations and includes a plurality of queues corresponding to ports on the multiport switch, a method of processing data frames, comprising:

receiving data frames at a plurality of receive devices;

transmitting the data frames to an external memory interface;

writing frame header information from the data frames to a plurality of queues corresponding to the plurality of receive devices, wherein the plurality of queues are formed on a memory device that includes a write port and a read port;

allocating time slots to the plurality of queuing devices;

transmitting the frame header information from the queues, via the read port and in successive time slots, to an internal decision making engine;

generating data forwarding information;

allocating time slots based on a predetermined priority;

transmitting frame header information during the allocated time slots; and transmitting a request signal to a scheduler, the request signal indicating that a first queue has stored frame header information.

8. The method of claim 7, comprising:

assigning at least one time slot in a scheduling cycle to each of the plurality of queues; and allocating the time slot assigned to a first queue when the request signal has been received.

9. The method of claim 7, wherein the frame header information comprises a source address and a destination address of the data frame.

10. The method of claim 7, wherein the frame header information comprises virtual local area network (VLAN) information.

11. A multiport switch configured for controlling communication of data frames between stations, comprising:

a plurality of receive devices corresponding to ports on the multiport switch, each of the receive devices configured to receive data frames and transmit the data frames on an internal bus to an external memory interface;

a plurality of queues corresponding to ports on the multiport switch, the plurality of queues formed on a memory device that includes a write port and a read port, wherein each of the plurality of queues is assigned at least one time slot in a scheduling cycle and is configured to store frame header information via the write port;

a scheduler configured to allocate time slots to the plurality of queues based on data traffic at the corresponding receive ports;

a decision making engine configured to receive the frame header information in successive time slots via the read port and to generate data forwarding information; and a memory controller configured to transfer frame header information from the plurality of queues to the decision making engine via the read port, wherein the scheduler is configured to allocate the time slots based on a predetermined priority and the read controller is configured to transmit frame header information to the decision making engine during the allocated time slots.

12. The multiport switch of claim 11, wherein:

the memory controller is configured to transmit a request signal to the scheduler, the request signal indicating that a first queue has stored frame header information, the scheduler is configured to allocate a time slot assigned to the first queue when the request signal has been received, and the memory controller is configured to transmit the frame header information from the first queue to the decision making engine during the allocated time slot.

13. The multiport switch of claim 11, wherein the frame header information comprises a source address, and a destination address of the data frame.

* * * * *

UNITED STATES PATENT AND TRADEMARK OFFICE
CERTIFICATE OF CORRECTION

PATENT NO. : 6,904,043 B1
DATED : June 7, 2005
INVENTOR(S) : Shashank Merchant et al.

It is certified that error appears in the above-identified patent and that said Letters Patent is hereby corrected as shown below:

Column 21,
Line 26, change "cach of the plurality" to -- each of the plurality --.

Signed and Sealed this

Ninth Day of August, 2005

JON W. DUDAS
*Director of the United States Patent and Trademark Office*